United States Patent [19]

Grevstad et al.

[11] 4,337,571
[45] Jul. 6, 1982

[54] METHOD FOR PRODUCING A FUEL CELL MANIFOLD SEAL

[75] Inventors: Paul E. Grevstad, West Hartford; Carl K. Johnson, Manchester; Anthony P. Mientek, Glastonbury, all of Conn.

[73] Assignee: The United States of America as represented by the United States Department of Energy, Washington, D.C.

[21] Appl. No.: 91,843

[22] Filed: Nov. 6, 1979

Related U.S. Application Data

[62] Division of Ser. No. 27,690, Apr. 6, 1979, Pat. No. 4,212,929.

[51] Int. Cl.³ .................. H01M 2/08; H01M 8/00
[52] U.S. Cl. ................................. 29/623.2; 277/22
[58] Field of Search ............... 29/623.2; 429/35, 36, 429/37, 38, 39, 185; 277/22

[56] References Cited

U.S. PATENT DOCUMENTS

| | | | |
|---|---|---|---|
| 2,628,852 | 2/1953 | Voytech | 277/22 |
| 3,206,332 | 9/1965 | Juda | 429/35 |
| 3,235,407 | 2/1966 | Nicholson et al. | 429/35 |
| 3,282,736 | 11/1966 | Rapp | 429/35 |
| 3,365,334 | 1/1968 | Thellmann | 429/35 |
| 3,395,047 | 7/1968 | Terry et al. | 429/35 |
| 3,436,272 | 4/1969 | Gelting | 429/39 |
| 3,442,714 | 5/1969 | Matsuno | 429/35 |
| 3,476,609 | 11/1969 | Gelting et al. | 429/37 |
| 3,575,719 | 4/1971 | Nelson et al. | 429/35 |
| 3,589,941 | 6/1971 | Eaton et al. | 429/38 |
| 3,615,838 | 10/1971 | Erickson | 429/35 |
| 3,880,670 | 4/1975 | Shinn | 429/38 |
| 4,195,119 | 3/1980 | Kummer | 429/38 |

*Primary Examiner*—Daniel C. Crane
*Attorney, Agent, or Firm*—L. E. Carnahan; Richard G. Besha; James E. Denny

[57] ABSTRACT

A manifold-to-stack seal and sealing method for fuel cell stacks. This seal system solves the problem of maintaining a low leak rate manifold seal as the fuel cell stack undergoes compressive creep. The seal system eliminates the problem of the manifold-to-stack seal sliding against the rough stack surface as the stack becomes shorter because of cell creep, which relative motion destroys the seal. The seal system described herein utilizes a polymer seal frame firmly clamped between the manifold and the stack such that the seal frame moves with the stack. Thus, as the stack creeps, the seal frame creeps with it, and there is no sliding at the rough, tough to seal, stack-to-seal frame interface. Here the sliding is on a smooth easy to seal location between the seal frame and the manifold.

3 Claims, 5 Drawing Figures

METHOD FOR PRODUCING A FUEL CELL MANIFOLD SEAL

BACKGROUND OF THE INVENTION

The invention described herein was made in the course of, or under, Contract No. ET-76-C-03-1169 between United Technologies Corporation and the United States Department of Energy.

This is a division of application Ser. No. 27,690, filed Apr. 6, 1979, now U.S. Pat. No. 4,212,929 issued July 15, 1980.

This invention relates to fuel cells, particularly to manifold-to-stack seals for fuel cells, and more particularly to a high creep capacity manifold sealing system for fuel cell stacks.

The fuel cell is a relatively new type of efficient electrical generator, which has been successfully used for space applications, for example, and which can have a favorable impact on the energy supply in the years to come.

A basic fuel cell comprises an anode electrode spaced apart from a cathode electrode with an electrolyte disposed therebetween in a compartment formed between the two electrodes; each electrode also includes a catalyst layer on the electrolyte side thereof. On the non-electrolyte side of the anode electrode is a reactant gas chamber for carrying a fuel, and on the nonelectrolyte side of the cathode electrode is a reactant gas chamber for carrying an oxidant. The electrodes are constructed so that the gas diffuses therethrough and comes into contact with the electrolyte in the catalyst layer thereby causing an electrochemical reaction whereby ions travel from the cathode electrode through the electrolyte to the anode electrode. This flow of ions and the accompanying external electron flow is basically the electric current produced by the cell.

In a fuel cell power plant a number of fuel cells are connected electrically in series through plates separating adjacent cells, thereby forming a stack. These plates in combination with the electrodes adjacent thereto, generally define the reactant gas passages or chambers. The voltage across the stack is the sum of the voltages across the individual cells, which is a function of the current produced by each cell. The amount of reactant gas utilized by each cell is directly proportional to the amount of current produced in the electrochemical reaction.

Various types of fuel cells have been developed, as exemplified by U.S. Pat. Nos. 3,132,972 issued May 12, 1964; 3,282,736 issued Nov. 1, 1966; 3,364,071 issued Jan. 16, 1968; 3,979,224 issued Sept. 7, 1976; and 3,994,748 issued Nov. 30, 1976.

Substantial effort has been directed to fuel cell seals to prevent leakage of the gas from the cell and for sealing between the electrodes containing a corrosive liquid electrolyte which destroys the seals. These prior sealing efforts are exemplified by U.S. Pat. Nos. 3,323,950 issued June 6, 1967; 3,326,722 issued June 20, 1967; 3,365,334 issued Jan. 23, 1968; 3,389,017 issued June 18, 1968; 3,607,418 issued Sept. 21, 1971; and 3,743,544 issued July 3, 1973.

With the development of fuel cell stacks, it was necessary to provide the stack with fuel and oxidant manifolds for simultaneous supply to and exhaust of gases from the individual cells of the stack. Accordingly, it became necessary to provide manifold-to-stack seals to prevent leakage of the gases involved in the operation of the fuel cell stack. Also, during operation of the fuel cell stack, the stack undergoes compressive creep. Thus, since the stack is made up of a series of cells, the surface of the stack is rough, and with compressive creep of the stack, the manifold-to-stack seals were forced to slide against the rough surface of the stack as the stack becomes shorter because of cell creep. This relative motion destroys the seals.

It is thus seen that one of the most difficult sealing problems in the development of low-cost, commercial fuel cell stacks is to provide high-integrity seals, particularly for maintaining a low leak rate manifold seal as the stack undergoes compressive creep.

SUMMARY OF THE INVENTION

The present invention provides a method for eliminating manifold-to-stack seal damage due to compressive creep of a fuel cell stack and provides a high creep capacity manifold sealing system. Thus, this invention solves the above-mentioned problem of manifold-to-stack seal damage caused by cell creep due to the relative motion between the seal and the rough surface of the fuel cell stack. This is accomplished simply by eliminating the relative motion, or sliding, between the seal and the stack. The high creep capacity manifold sealing system consists of a polymer seal frame located between the manifold and the stack and secured such that as the stack creeps, the seal frame creeps with it, and sliding motion takes place between the manifold and the seal frame—a smooth surface—which does not damage the seal.

Therefore, it is an object of this invention to provide a method for producing high-integrity manifold-to-stack seals for fuel cell power systems.

A further object of the invention is to provide a manifold-to-stack seal for fuel cell stacks.

Another object of the invention is to provide a manifold-to-stack seal for fuel cell stacks which eliminates relative motion between the stack and the seal during cell creep.

Another object of the invention is to provide a high creep capacity manifold sealing system for a fuel cell stack.

Another object of the invention is to provide a manifold-to-stack seal for fuel cell stacks which utilizes a polymer seal frame secured so as to move with the cell stack during compressive creep of the cells, thus eliminating relative motion between the frame and the stack.

Other objects of the invention will become readily apparent from the following description and accompanying drawings.

DETAILED DESCRIPTION OF THE INVENTION

The present invention involves a unique method for providing manifold-to-stack seals for fuel cell stacks which maintains a low leak rate as the stack undergoes compressive creep. Unlike prior known seal systems, which use fixed geometry arrangements that force the manifold-to-stack seal to slide against the rough surface of the stack as the stack becomes shorter because of cell creep resulting in seal damage or destruction, the seal system of the present invention eliminates the relative motion between the stack and the seal. This is accomplished by securing a polymer seal frame between the manifold and the stack such that as the stack creeps, the seal frame creeps with it. Thus, there is no sliding of the seal at the rough, difficult to seal, stack-to-seal frame interface, with the sliding being carried out on a smooth, easy to seal, surface; namely, that surface between the seal frame and the manifold.

Figure 1:
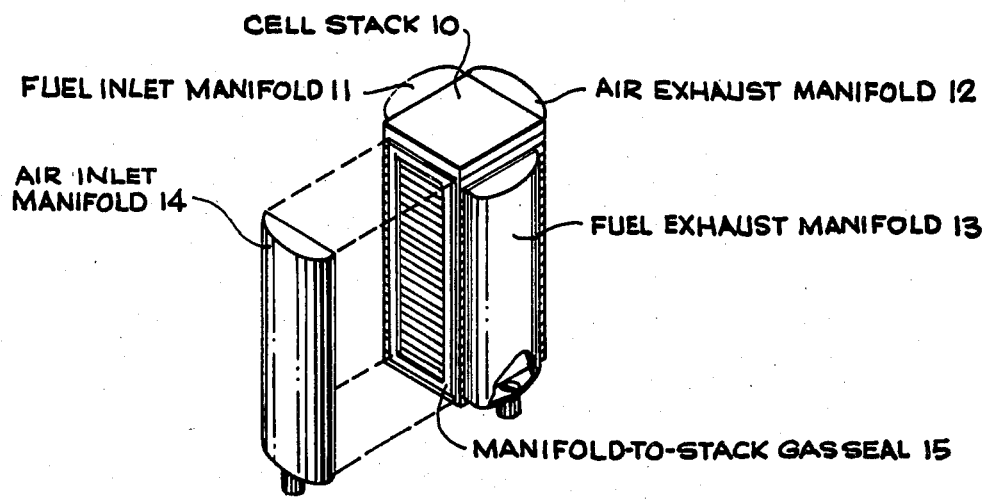
FIG. 1 illustrates a fuel cell stack and associated fuel and air manifolds incorporating the seal frame system of the invention.

FIG. 1 illustrates a fuel cell stack and its manifold arrangement and consists basically of a cell stack 10, a fuel inlet manifold 11, an air exit manifold 12, a fuel exit manifold 13 and an air inlet manifold 14, each manifold having the form of a hollow pan with edges abutting the side surfaces of cell stack 10. Manifold 14 is shown in a removed position to illustrate a manifold-to-stack gas seal 15 positioned between the manifold's lip or edge and the fuel cell stack 10, described in greater detail with respect to FIGS. 2 and 3. The manifolds 11-14 may be secured to cell stack 10, for example, by a series of straps, see FIG. 2, which surround the manifolds and force them against the cell stack surface, with a seal 15 firmly clamped between each of manifolds 11-14 and the associated surface of the cell stack.

Figures 2, 3:
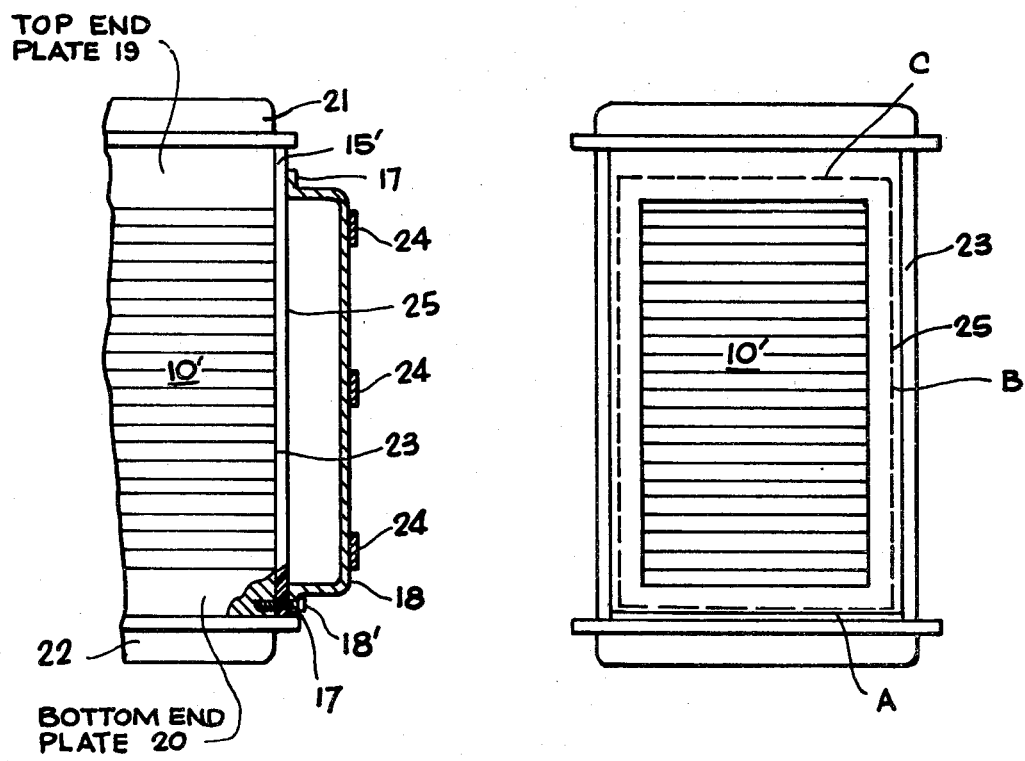
FIG. 2 illustrates a cutaway portion of an embodiment of a fuel cell stack incorporating the manifold-to-stack seal system of the invention.
FIG. 3 is front view of the FIG. 2 fuel cell stack with the manifold removed, illustrating the seal frame system of the invention.

Referring to the embodiment illustrated in FIG. 2 a polymer seal frame 15' is located between a lip or edge 17 of a manifold 18 (similar to any of manifolds 11-14 of FIG. 1) and the cell stack 10' consisting of a series of cells located between a top end plate 19 and a bottom end plate 20, with end plates 19 and 20 being retained between pressure and/or insulator plates 21 and 22, respectively, as known in the fuel cell stack art. The manifold 18 may, for example, be secured to bottom end plate 20 by bolts, etc., indicated at 18', or secured to the frame rather than the end plate, or otherwise supported. A rough surface of the stack under the seal frame 15', indicated at 23, is dressed with a caulk/grease in a manner known in the art to provide sealing of any surface depressions beneath the seal frame. The polymer seal frame 15' is firmly clamped between manifold 18 and stack 10' by straps 24 or other means as described above. Note that manifold 18 does not contact the surface of cell stack 10', with the manifold lips 17 contacting seal frame 15' about the entire circumference thereof, as can be visualized more clearly with respect to FIG. 3.

FIG. 3 illustrates one of the four surfaces of the cell stack of the FIG. 2 embodiment, similar to FIG. 1, with the manifold removed for clarity. Polymer seal frame 15' is positioned on rough surface 23 of the cell stack 10'. The waving line, indicated at 25, extending about the surface of seal frame 15' indicates the sealing area or sealing loads between the seal frame 15' and the manifold 18. When the cell stack 10' undergoes compressive creep, the seal frame 15' is forced to creep with it, and reference points A, B, and C are utilized to illustrate the sliding effect between seal frame 15' and manifold lip 17. At area or point A essentially no sliding takes place between the seal frame 15' and manifold lip 17, while at point B the seal frame slides parallel to the manifold lip, and at point C the seal frame slides perpendicular to the manifold lip. Should the manifold 18 be secured to the top end plate 19 instead of bottom end plate 20 or to the top of the frame 15', the above-described sliding will take place along point B and point A, with essentially no sliding of the seal frame with respect to the manifold lip at point C.

Between the seal frame 15' and the manifold lip 17, a conformable member may be located to assist sealing this interface. This conformable member can be an O-ring, a thin sheet of soft polymer, thin labyrinth-type ridges, or the same caulk used to dress the surface between the stack 10' and the seal frame. If the manifold lip and seal frame surfaces are constructed so as to form fully mating surfaces, the conformable member may be omitted.

Thus, with the manifold fixed at the bottom of the cell stack, as in the FIG. 2 embodiment, the maximum stack-to-manifold relative movement takes place at the top. The polymer frame is made sufficiently wide and the manifold's top lip has sufficient smooth bearing area so that the lip will slide on the seal frame. As the cell stack creeps the polymer seal frame stays with it, as it is held against the side of the cell stack by the sealing loads applied to the manifold by its attachment structure (e.g., bolts 18' and straps 24). The relative motion caused by creep occurs at the smooth seal frame to manifold interface.

Figure 4:
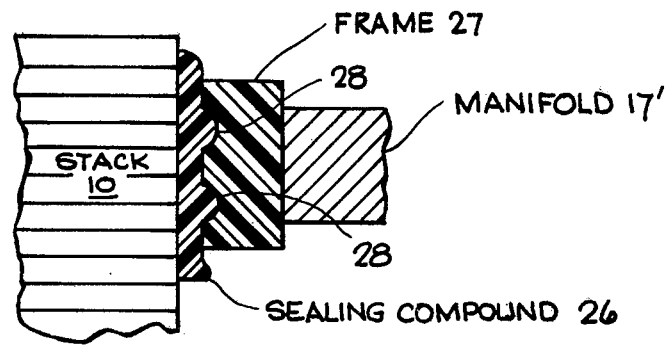
FIG. 4 is a partial cross-sectional view of an embodiment of a manifold-to-stack seal system made in accordance with the invention.

FIG. 4 illustrates an embodiment of the polymer sealing frame utilized between a cell stack and a manifold in accordance with the invention. Inasmuch as electrical isolation of the manifold from the cell stack is required, where metal manifolds are used, the polymer seal frame may be constructed of dielectric material and/or include an insulator, as shown in FIG. 4. Also, the metal of the manifold, particularly if constructed of steel, must be protected from the acidic stack environment, which for example, may be provided by a thin (about 0.010 inch thick) coating of high temperature polymer, such as perfluoroalkoxy (PFA), on the inner surface of the manifold. In FIG. 4, a sealing compound 26 and an electrical insulator 27 form the polymer seal frame located between stack 10' and manifold lip 17'. The electrical insulator or frame 27 may be constructed of polytetrafluoroethylene (PTFE) since it has sufficient temperature and chemical compatibility, and has the required electrical resistivity characteristics. Also, PTFE can be fabricated economically while extrusions thereof can be made in shapes required to mate with the metal manifold and to contain the stack-to-manifold sealant. The sealant (sealing compound 26) must be retained to prevent extrusion at the higher seal loads required to prevent manifold "blow-off". The seal frame of the FIG. 4 embodiment provides for a footprint of sealing compound 26 sufficient to withstand the manifold loads and utilizes a mechanical retention feature such as two grooves 28, for example, in the insulator 27 to hold the sealant from extruding. Also, indentations such as dimples can be used to prevent sealant from extruding. Here, the relative motion during cell creep is between insulator 27 and manifold lip 17'. As pointed out above, the manifold attachment structure clamps or straps the sealing surfaces of the manifolds (manifold lips 17 or 17') against the sides of the cell stack 10'. The clamping load must be sufficient to effect the seal and to overcome "blow-off" caused by differential pressures; it must also accommodate the differential thermal expansion between the stack and manifold. Flat steel straps, indicated at 24 in FIG. 2, having turnbuckle tensioning devices with compression springs provide the required clamping loads. The back and side walls of the manifolds (see FIG. 1) are configured to provide the required section moduli to control the amount of wall deflection caused by the strap loads.

The gas sealing function at the stack-to-manifold interface is provided by a sealant (sealing compound 26 in FIG. 4) and a caulk/grease thereunder. As pointed out above, the gaps between the cells and plates, forming the rough cell surface 23 in FIGS. 2 & 3, are filled with a caulk. Since the caulk and the sealant bridges from cell to cell, it is required to be dielectric, and must also be hydrophobic to the electrolyte so as to not form an ionic shorting path. The sealing compound 26 of FIG. 4, for example, may be Teflon with the caulk being composed of PTFE powder and a high molecular-weight, fluorinated oil.

The polymer of the seal frame will shrink along with the cell stack, as illustrated in the following example:

Utilizing a stack of 500 fuel cells, which is about 100 inches tall and ~24 inches wide, and say the cells each creep 4 mils, then $0.004 \times 500 = 2$ inches total creep. The stack therefore, shrinks 2 inches or 2% over its operating life. Supposing the polymer seal frame is composed of tetrafluoroethylene (Teflon) having a thickness of 1/16" to $\frac{1}{8}$", at 400° F. Teflon has a modulus of about 10,000 PSI per in/in of strain. For 2% strain (equivalent of the cell creep or shrinkage), this results in an elastic stress of only 200 PSI in the Teflon, which is no problem. Even if the Teflon were to remain elastic, this low stress level could be generated. But Teflon creeps. Put 200 PSI on Teflon at 400° F. and in 1000 hours it has shrunk 6%. Therefore, a Teflon seal frame will follow the shrinkage of the cell stack with no problem.

Figure 5:
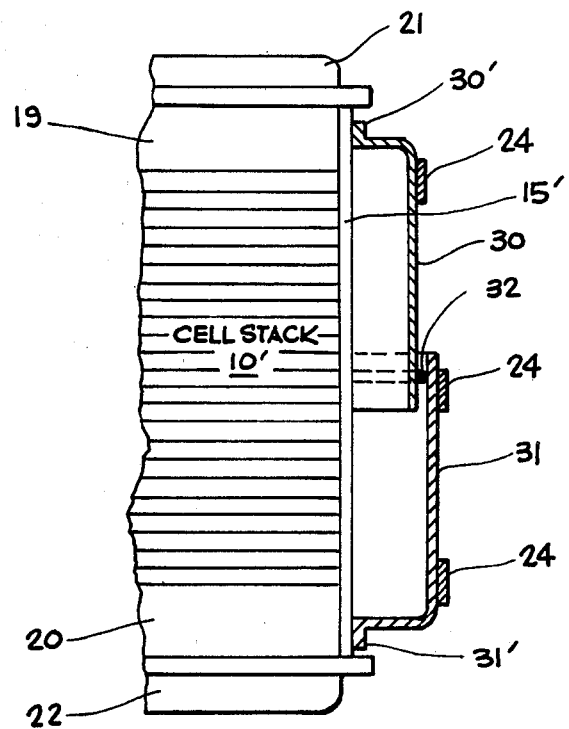
FIG. 5 is a cutaway section of a fuel cell stack incorporating the seal frame system of the invention with a two section manifold.

FIG. 5 illustrates a split manifold embodiment incorporating the polymer seal frame of this invention, with components corresponding to those of FIG. 2 being given similar reference numerals. The manifold in FIG. 5 consists of two telescoping or overlapping sections or halves 30 and 31 with top section 30 being secured to top end plate 19, via bolts, etc., as in FIG. 2, and bottom section 31 secured to bottom end plate 20, so there is no sliding of the manifold sections on seal frame 15' at these ends and at manifold side edges. Each of manifold sections 30 and 31 having lips or flanges 30' and 31', respectively, which abut against the polymer seal frame 15' as in the FIG. 2 embodiment. To seal the overlapping area or gap of the two manifold sections 30 and 31, a gap seal 32 is utilized which has some conformability/resiliency, such as an O-ring, labyrinth type of polymer seal, windshield wiper blade type, etc. The gap seal 32 may be attached to either of the manifold sections to retain same in place. The overlap between the two manifold sections may be large enough to eliminate the concern of fuel cell stack builders that the stack height will match the fixed manifold height.

While the manifolds have been illustrated, as in FIG. 1, to have the inlet and outlet manifolds on opposite sides of the stacks, the reactant inlet and outlet manifolds, for example, may be located on the same side of the stack, and sealed in accordance with the present invention.

It has thus been shown that the present invention provides a method and unique polymer seal frame which overcomes the problem of fuel cell compressive creep, which results in relative motion between components and in the prior approaches was detrimental to manifold-to-stack seals. The polymer seal frame creeps with the fuel cells and this eliminates the sliding problem of the seal against the rough surface of the fuel cell stack. Here the relative motion is between the seal and the manifold—a smooth surface—which results in no damage to the seal while allowing for cell creep.

While particular embodiments, materials, and parameters have been set forth to describe the invention, modifications will become apparent to those skilled in the art, and it is intended to cover in the appended claims all such modifications as come within the spirit and scope of the invention.

What we claim is:

1. A method for producing a fuel cell manifold-to-stack seal which eliminates damage to the seal by the sliding motion of the seal against the rough surface of the fuel cell stack as it undergoes compressive creep, comprising the steps of: providing a polymer seal frame which includes a sealing means between the manifold and the fuel cell stack for producing a seal therebetween, securing the polymer seal frame between the manifold and the fuel cell stack such that as the stack creeps the seal frame creeps with it, with sliding motion being between the seal frame and the manifold while maintaining a sealing effect therebetween, immovably securing one end only of the manifold to the fuel cell stack, and maintaining the manifold against the polymer seal frame and fuel cell stack to produce a desired seal loading thereon.

2. The method defined in claim 1, additionally including the step of: dressing the rough surface of the fuel cell stack located under the polymer seal frame with a caulk/grease prior to positioning the polymer seal frame between the stack and the manifold to increase sealing effect.

3. The method of claim 1, additionally including the steps of: utilizing a manifold that has overlapping sections, securing one end of each of the overlapping sections to the fuel cell stack, providing a sealing member between overlapping areas of the overlapping sections, and clamping the sections against the polymer seal frame and fuel cell stack to produce a desired seal loading thereon.

* * * * *